May 12, 1959 K. D. ELWICK 2,886,332
FLAIL-TYPE MATERIAL UNLOADER
Filed June 3, 1957 2 Sheets-Sheet 1
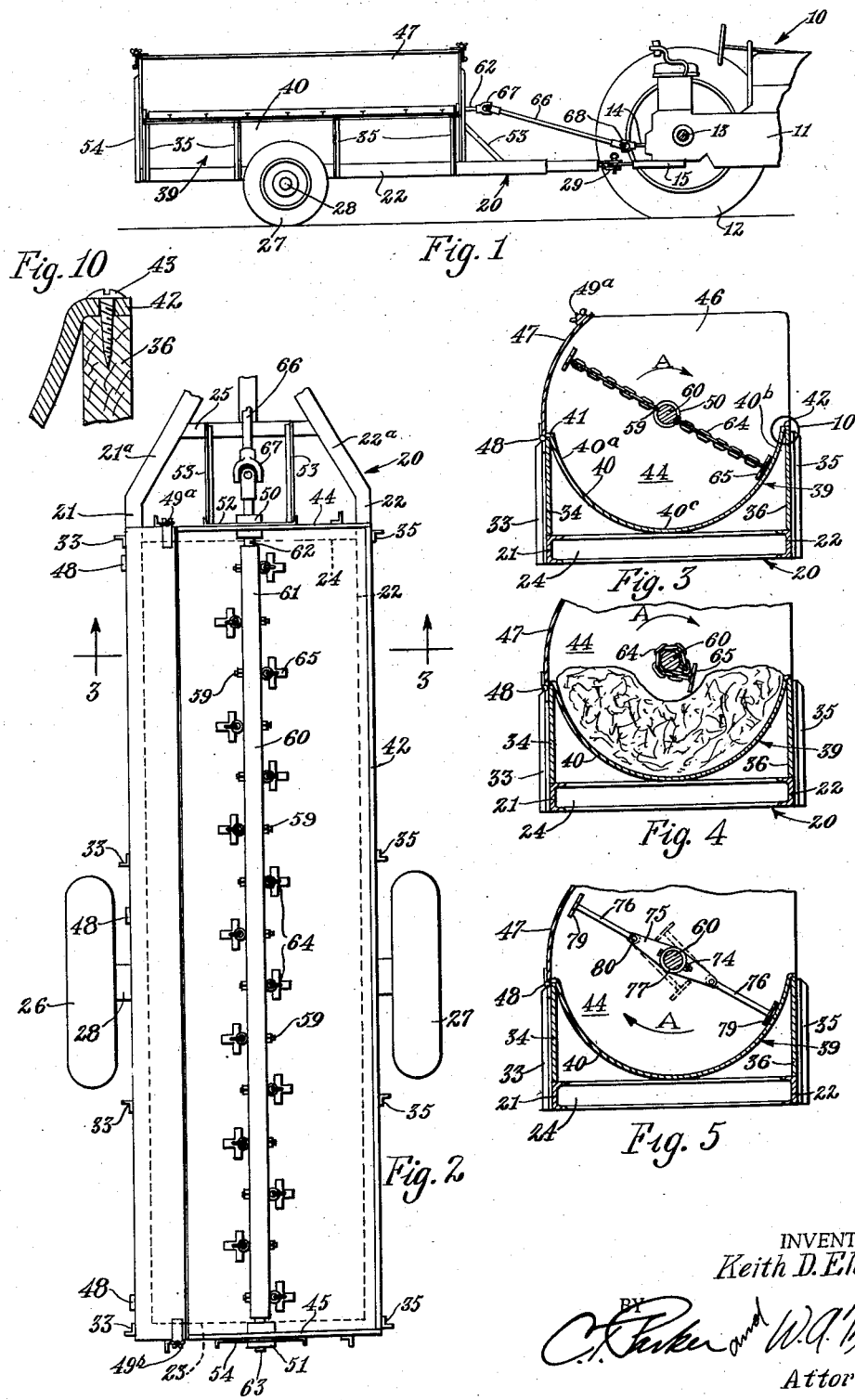
INVENTOR.
Keith D. Elwick May 12, 1959        K. D. ELWICK        2,886,332
FLAIL-TYPE MATERIAL UNLOADER Filed June 3, 1957        2 Sheets-Sheet 2

INVENTOR.
Keith D. Elwick
BY
C. Parker and W. A. Murray
Attorneys

United States Patent Office 2,886,332
Patented May 12, 1959

2,886,332

FLAIL-TYPE MATERIAL UNLOADER

Keith D. Elwick, Vinton, Iowa

Application June 3, 1957, Serial No. 663,074

21 Claims. (Cl. 275—3)

This invention relates to a material unloading implement. Still more particularly this invention relates to a manure spreader of a new and novel design.

Present day conventional manure spreaders feature a box type body having a material conveyor moving over its bottom to feed manure or like material rearwardly to rear mounted beaters and widespread members from where it is fed from the rear of the spreader. It should be noted that in this type of spreader considerable expense is required to build and maintain the drive mechanisms which operate the floor conveyor, the beaters, and the widespreads. Since the spreader is normally operated from the power take-off shaft on a tractor, the overall capacity of the spreader is limited so as to not overload the power take-off shaft. Also, manure issuing from the conventional type of manure spreader will in many instances be spread in large chunks which has an undesirable effect on the ground on which it lands, since in many instances, scorched or burned areas will result.

It is therefore one of the main objects of the present invention to provide a manure spreader or a material unloading implement which requires less power to unload, thereby being capable of increased capacity, and also one which eliminates all but a single drive mechanism which is used only to unload the material or manure from the spreader body.

It is a further object of the invention to provide a new type of spreading mechanism which fully pulverizes the material prior to being discharged from the spreader.

It is still a further object of the invention to provide a manure spreader which feeds material over one side of the box and unloads evenly from all portions of the box or container at the same time.

It is also an object of this invention to provide a simplified manure container or box which may be easily removed from the spreader frame and placed in an area or position where it may receive manure directly from the barn or feed lot where the manure is collected.

Other objects and advantages of the invention will become apparent to those skilled in the art as the nature of the invention is better understood from the following complete disclosure as illustrated in the accompanying drawings.

Fig. 1 is a side elevation of the material unloader and tractor assembly. The rear wheel of the tractor has been removed for purposes of clarity.

Fig. 2 is a partial plan view of the material unloader.

Fig. 3 is a sectional view taken along the line 3—3 of Fig. 2.

Fig. 4 is a similar view to Fig. 3 showing the unloading mechanism in different positions.

Fig. 5 is a view similar to Fig. 3 showing a modification of the invention.

Fig. 10 is a sectional view indicated by section 10 on Fig. 3.

Figure 6:
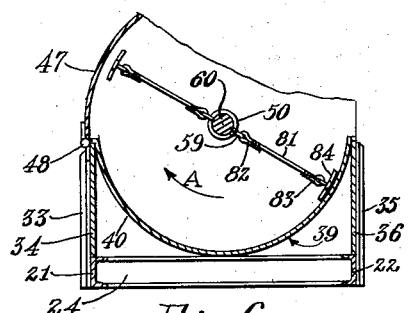
Fig. 6 is a view similar to Fig. 3 showing a further modification of the invention.

Referring now to Fig. 1, the tractor 10 is of conventional form having an elongated tractor body 11 supported at its forward end by front steerable wheels, not shown, and at its rear by rear traction wheels, the left tractor wheel being indicated at 12, and a rear transverse axle 13. The tractor 10 is also characterized by having a conventional power take-off shaft 14 extending rearwardly from the tractor body 11 and a drawbar 15 fixed to the underside of the tractor body 11.

The material of manure spreader includes an elongated main frame 20 including left and right-hand channel members 21, 22 respectively running lengthwise of the spreader, interconnected at their rear ends by a transverse member 23 and at their forward ends by a transverse channel member 24, and forwardly converging portions 21a, 22a of the side channel members 21, 22. The forwardly projecting portions 21a, 22a are cross braced by a structural member 25. The main frame 20 is supported at the mid-portion of the material unloader by a pair of transversely spaced apart wheels 26, 27 which are carried on a transverse axle 28, and at its forward end by means of the tractor drawbar 15 which is connected to the main frame 20 by a conventional type clevis connection 29.

Upright angle irons 33 have their lower ends welded to the outer surface of the left-hand channel member 21. The angle irons 33 are bolted or otherwise fixed to a boarded side 34 the lower end of which is supported vertically by the channel member 21. Upright angle irons 35 are welded at their lower ends to the right hand channel member 22 and serve as lateral support for a right wooden or boarded side 36, the lower end of which is supported vertically on the channel member 22.

A material container 39 having a semi-cylindrical or U-shape central portion 40 is supported on the wooden side boards 34, 36 by means of lips or flanges 41, 42 which extend outwardly to lie adjacent to the upper edges of the sides 34, 36. In the sense that it is treated as a U-shaped member, the central portion may be described as having transversely spaced apart curved and opposed side walls 40a, 40b, interconnected by a bottom wall portion 40c. As shown in Fig. 10 the container 39 is detachably connected to the side boards by means of wood screws 43 which fix the lips 41, 42 to the respective side boards 34, 36. The container 39 is further characterized by having opposite end walls 44, 45, the forward wall of which extends outwardly as at 46 from the end of the body portion 40 to a height considerably above the edges 41, 42 of the body 40 to shield the driver from material which might be blown or driven from the forward end of the spreader. The rear end section 45 is of semi-circular shape and encloses the end of the body 40. The ends 44, 45 serve as upright supports for bearing members 50, 51, respectively.

The left-hand side of the container 39 is extended above the right hand side 40b by means of a side extension or hood 47. The hood is formed to a partial cylindrical shape and serves when in a position shown in the drawings to both guide materials or manure over the right-hand side 40b and also to restrict or prevent movement of materials over the left wall. The hood 47 is hinged, as at 48, to the side 40a of the container 40 to be swung to varying angular positions, and may be swung back to permit complete removal of the container 40 from the side members 34, 36, or for loading of material in the container. Latches 49a, 49b are provided to hold the hood in position. While the hood is shown as being adjustable to only two angular positions, additional angular positions could be obtained by simple devices.

Since the hood 47 is substantially a continuation of the semi-cylindrical body 40, although there will be a slight variation in radii forming the cylinder of an amount equal to the slight overhang or lip 41, the combination of cylindrical portions 40, 47 may be treated as a solid cylindrical body with the exception of a material discharge opening, the material discharge opening in this instance extending from the upper edge of the hood 47 to the upper edge of the side portion 40b.

An additional plate 52 and trusses 53 reinforce the forward end wall 44 for supporting the bearing 50 and a similar plate 54 serves to reinforce the rear end section 45 for supporting the bearing 51. A longitudinally extending shaft 60 is positioned on the axis of the cylindrical body 40 or centrally between the side walls 40a, 40b, and above the bottom portion 40c. The exact construction of the shaft 60 is unimportant for purposes of this invention, but in the present instance is that of a solid shaft having an enlarged central portion 61 with opposite ends inset as at 62 and 63 for journaling in the bearings 50, 51, respectively.

Referring now to the first form of the invention, that shown in Figs. 1–4, extensible and flexible arm elements in the form of link chains 64 are removably connected to the shaft 60 at their inner or shaft-proximate end by means of an eye bolt 59 extending through the shaft 60. The free or outer end of the chains 64 are characterized by having a drag 65 composed of either a plate or in this instance by a pair of crossed rods which, as will later be explained, drag through the material.

The forward end of the shaft 60 projects forwardly from the bearing 50 and is connected to a drive shaft 66 by a universal joint 67. The forward end of the shaft 66 is connected to the power take-off shaft 14 by a second universal joint 68. Thus, rotation of the shaft 60 occurs through a drive means connected to the power take-off shaft on the tractor.

Fig. 2 shows the spreader in a position in which the shaft 60 is not rotating with the chains 64 seen hanging from their respective eye bolts 59. Fig. 3 shows the chains 64 with the chains fully extended radially from the shaft 60, a condition which will occur when the shaft moves at a rate of rotation sufficient to cause the chains to extend. Fig. 4 shows the chains wrapped or bent around the shaft 60, a condition which will occur when the spreader or container 39 is full and upon initial rotation of the shaft 60 which causes the drag 65 and chain 64 to resist rotation of the shaft 60 and thereby wrap the chain 64 about the shaft.

The manure spreader will operate in the following manner. The entire spreader will be moved to a position to collect manure or other such type of material. From a practical standpoint the container 40 may be filled by use of a manure loader, or may be positioned to receive manure from an automatic conveying system leading from a barn or other type of structure. The mode of loading the spreader is unimportant other than that normally the hood 47 will be moved to its downward position to permit the maximum opening at the top of the spreader. Inasmuch as the spreader will be loaded while the chains are in their depending position, as shown in Fig. 2, the material loaded in the spreader will normally hold the links in that position until the shaft 60 is caused to rotate. Initial rotation of the shaft 60 will cause the chains 64 to wrap themselves around the shaft, as shown in Fig. 4, this position of the chains being created by the resistance of the drags 65 to move through the material. Upon the manure being removed adjacent to the shaft 60 the chain will be free to extend radially. The manure will be gradually unloaded from the body 40 until the chains are fully extended as shown in Fig. 3. Consequently, the flexible arms or chains 64 may be said to be automatically extensible in response to rotation of the shaft 60 to cause the free ends of the chains to engage the material next adjacent the shaft to drive the material over the side 40b. Inasmuch as the chains are mounted on the full length of the shaft 60 material from all parts of the loader will be thrown over the right edge 42 of the semi-cylindrical container.

The hood 47 serves to prevent the material from flowing over the left hand side 40a of the container 39. The shaft 60 will rotate in the direction of the arrow A and therefore the natural tendency for the material will be to move to the right and over the right hand side 40b of the spreader. Also, the flailing operation of the chains 64 and the drags 65 will operate to pulverize the material in the spreader as well as move the material outward of the spreader in a flaked or pulverized condition to cause the manure to be spread evenly over the ground.

In the modification shown in Fig. 5, the flexible arm members are composed of inner and outer arm sections 75, 76, respectively interconnected at adjoining ends by a pivot pin 80. The inner section 75 has annular flange portions 77 which are detachably connected to the shaft 60 by means of a bolt and nut combination 74. The outer arm section is provided at its free end with a drag 79 similar to the drag of the previous form of the invention. The inner end of the outer section 76 is pivoted to the inner arm section 75 by means of a pivot pin 80.

As shown in dotted representation in Fig. 5, the outer sections 76 may swing inwardly on the pivot pin 80 to rest against the shaft 60 to in effect cause the entire flexible arm means to bend about the shaft 60. This, of course, occurs in the initial movement of the shaft 60 after the spreader has been loaded. Again, as the spreader begins to unload the arm sections 76 will tend to extend outwardly until they reach the position shown in Fig. 5 when the spreader is substantially empty.

Fig. 6 shows a further modification of the invention. The flexible arms are made up entirely of cables 81, each having their inner end connected to the eye bolts 59 by means of a bight 82. A similar bight 83 mounts the drag 84 on the free end of the cable 81. In operation the modified form of the invention shown in Fig. 6 operates in a manner similar to the previous forms of the invention, slight distinctions being obvious.

Figure 7:
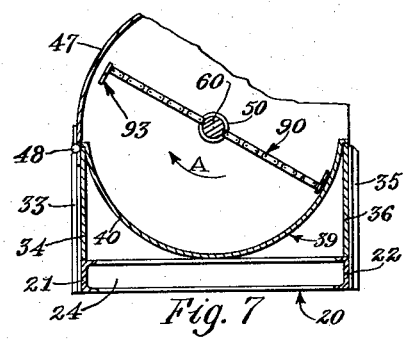
Fig. 7 is a view similar to Fig. 3 showing still a further modification of the invention.
Figure 8:
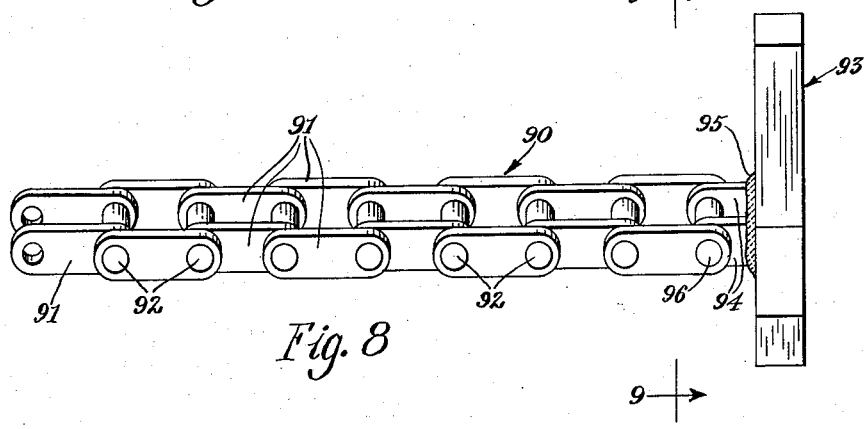
Fig. 8 is an enlarged perspective view of the chain linkage of Fig. 7.
Figure 9:
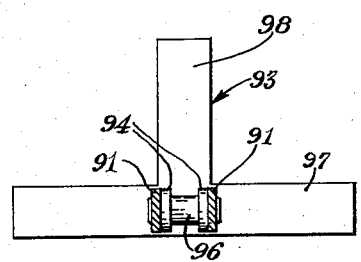
Fig. 9 is a sectional view taken along the line 9—9 of Fig. 8.

Figs. 7, 8, and 9 shows a further modification of the invention specifically featuring a different type of chain and also a reversible type drag. Featured is a chain 90 composed of a series of pairs of parallel and spaced apart links 91 interconnected in end to end relationship by pivot pins 92 which are parallel to the axis of the shaft 60. The outer or free end of the chain 90 is connected to a drag 93 by means of a pair of parallel brackets 94 which are welded, as at 95 to the drag 93 and is mounted on the free end of the chain 90 by means of a pin 96. The links 91 of the chains and drag 93 are therefore free only to pivot about axes parallel to the axis of the shaft 60 and are restricted from moving axially relative to the shaft 60.

The drag 93 is provided with a leading edge, relative to the direction of travel, formed by a rod 97 disposed substantially parallel to the axis of the shaft 60 and a trailing rod 98 which is at right angles to the rod 97 and in a trailing direction relative to the direction of rotation.

In operation, the modified form of Figs. 7–9 will, through the nature of the chain 90, prevent the drag from moving fore-and-aft relative to the spreader and consequently will prevent the chains from interlocking at their free ends. Viewing Fig. 9, it may be seen that the drag 93 may be reversed so that the rod 98 serves as the leading edge of the drag. In effect, therefore, there is an aggressive side on the drag 93 and a less aggressive side. Merely by removing the pin 96 and positioning the drag 93 properly either of the edges of the drag 93 may be moved to be the leading edge.

While several forms of the invention have been shown for the purposes of clearly and concisely illustrating the principles of the invention, it should be recognized that such were given for purposes of description and were not meant to show all possible forms. Also, while the invention was described for use as a manure spreader, such was done for illustration purposes only and it should be fully understood that the implement could be used to unload any type of material by mounting different sizes of or type of drags and flexible arms on the shaft 60. The present detailed description was not meant in any way to limit the invention beyond the broad general principles herein disclosed and claimed.

What is claimed is:

1. A material unloading implement attachable to a tractor having a power take-off shaft and an implement connecting means, comprising: a mobile implement frame having front and rear ends and attachable at its front end to the implement connecting means; a material container having a fore-and-aft extending elongated body portion of U-shaped cross section including transversely spaced side walls, and front and rear walls at the front and rear ends respectively of the central body portion closing the ends of said body portion; a fore-and-aft extending rotatable shaft centrally located between the side walls and extending between said end walls; a plurality of arm elements axially spaced on the shaft, said arm elements being flexible to bend about the shaft and to extend radially proximate to the inner surface of said central body portion upon rotation of the shaft; a drag member on each of said flexible arms operative upon rotation of the shaft to drag through material in the container and to discharge it over one side wall of the container; a side wall extension extending upwardly from the other of said side walls and formed to restrict material from moving over said other side wall; and drive means between said shaft and the power take-off shaft for rotating the former.

2. A material unloading implement attachable to a tractor having a power take-off shaft and an implement connecting means, comprising: a mobile implement frame having front and rear ends and attachable at its front end to the implement connecting means; a material container having a fore-and-aft extending elongated body portion of U-shaped cross section including transversely spaced side walls, and front and rear walls at the front and rear ends respectively of the central body portion closing the ends of said body portion; a fore-and-aft extending rotatable shaft centrally located between the side walls and extending between said end walls; a plurality of arm elements axially spaced on the shaft, said arm elements being flexible to bend about the shaft and to extend radially proximate to the inner surface of said central body portion upon rotation of the shaft; a side wall extension extending upwardly from one of the side walls and formed to restrict material from moving over said one side wall; and drive means between said shaft and the power take-off shaft for rotating the former.

3. The invention defined in claim 2 in which the side wall extension is mounted adjacent one of the side walls and is adjustable to a plurality of angular positions relative to the top edge of the respective side wall.

4. A material unloading implement comprising: a mobile implement frame having front and rear ends; a material container mounted on the frame and having a fore-and-aft extending elongated body portion of U-shaped cross section including transversely spaced side walls interconnected by a bottom wall portion, and front and rear walls at the front and rear ends respectively of the central body portion closing the ends of said body portion; a fore-and-aft extending rotatable shaft centrally located between the side walls and above the bottom wall portion and extending between said end walls; a plurality of chains mounted on and axially spaced on the shaft; a drag member on the free end of each of said chains operative upon rotation of the shaft to drag through material in the container and to discharge the material over one side wall of the container, said chain and drag member being of a length substantially equal to the distance between said shaft and the nearest portion of the container; and means effecting rotation of the shaft.

5. A material unloading implement comprising: a material container having an elongated body portion of U-shaped cross section including transversely spaced side walls interconnected by a bottom wall portion, and front and rear walls at opposite ends respectively of the central body portion for closing the ends of said body portion: a longitudinally extending rotatable shaft located between the side walls and above the bottom wall portion and extending between said end walls; and a plurality of chains mounted on and axially spaced on the shaft, said chains being of a length substantially equal to the distance between said shaft and the nearest portion of the container; and means effecting rotation of the shaft.

6. A material unloading implement comprising: a material container having an elongated body portion including transversely spaced side walls interconnected by a bottom wall portion, and front and rear walls at opposite ends respectively of the central body portion for closing the ends of said body portion; a longitudinally extending rotatable shaft located between the side walls and above the bottom wall portion and extending between said end walls; and a plurality of radially extending flexible arm elements mounted on and axially spaced on the shaft, said arm elements being of a length in their extended condition substantially equal to the distance between said shaft and the nearest portion of the container.

7. A material unloading implement comprising: a main frame; a pair of spaced apart supports on the frame; a rotatable shaft journaled on the supports; a material container opening from above and formed about the shaft and including opposed side walls on opposite sides of the shaft; a plurality of axially spaced arm elements mounted on the shaft, each of the arm elements being flexible to bend about the shaft and to extend radially proximate the inner walls of the container; drag members connected to the free end of the arm elements for driving material from the container as the shaft is rotated; and means effecting rotation of the shaft.

8. The invention defined in claim 9, in which the container is made up of a plurality of partial cylindrical portions, at least one of which may be removed to permit loading of the container.

9. A material unloading implement comprising: a main frame; a pair of spaced apart supports on the frame; a rotatable shaft journaled on the supports; a material container opening from above and formed about the shaft, said container having an inner peripheral surface spaced from the shaft including opposed side walls on opposite sides of the shaft; a plurality of axially spaced arm elements mounted on the shaft, each of the arm elements being flexible to bend about the shaft and to extend radially proximate to the inner surface of the container; and means effecting rotation of the shaft.

10. A material unloading implement comprising: a main frame; a pair of spaced apart upright supports on the frame; a rotatable shaft journaled on the supports; a material container having side portions spaced from and on opposite sides of the shaft and a bottom portion beneath the shaft; and arm elements mounted on the shaft, said arm elements being flexible to bend about the shaft and to extend radially proximate to the inner surface of the container; and means effecting rotation of the shaft.

11. The invention defined in claim 9, in which each of the flexible arm elements is a link type chain and further characterized by the links of said link type chain being interconnected by means limiting pivotal movement between adjacent links about an axis substantially parallel to the shaft axis thereby restricting movement of the free end of the chain axially relative to the shaft axis.

12. The invention defined in claim 9, further characterized by a drag member on the free end of the flexible arm element, said drag member being characterized by having a plurality of edges of varying degrees of aggressiveness; and means selectively connecting the drag member to the arm elements to move one of said edges into a leading edge relative to the direction of rotation.

13. The invention defined in claim 9, in which said flexible arm element is in the form of a cable.

14. The invention defined in claim 9, in which said each of the flexible arm elements is in the form of at least two arm segments pivotally interconnected at adjoining ends and one of the segments is connected to the shaft at an end opposite to its said adjoining end.

15. A material unloading implement comprising: a main frame; a pair of spaced apart upright supports on the frame; a rotatable shaft journaled on the supports; a material enclosure longitudinally disposed relative to the shaft and enclosing said shaft except for a material discharge opening therein; a plurality of axially spaced arm elements mounted on the shaft, each of the arm elements being flexible to bend about the shaft and to extend radially to the nearest surface of the enclosure; and means effecting rotation of the rotatable shaft.

16. A material unloading implement attachable to a tractor having a power take-off shaft and an implement connecting means, comprising: a mobile implement frame having front and rear ends and attachable at its front end to the implement connecting means; a material container having a fore-and-aft extending elongated central body portion of U-shaped cross section including transversely spaced side walls, one of the walls extending upwardly from the other and formed to restrict material from moving over said one wall, and front and rear walls at the front and rear ends respectively of the central body portion closing the ends of said body portion; a fore-and-aft extending rotatable shaft located between the side walls and above the bottom portion and extending between said end walls; a plurality of arm elements axially spaced on the shaft, said arm elements being flexible to bend about the shaft and to extend radially proximate to the inner surface of said central body portion; and drive means between said shaft and the power take-off shaft for rotating the former to cause said arm elements to drive material over said other wall.

17. The invention defined in claim 16, in which the front wall is enlarged to extend outwardly from the front end of the material container for shielding the area forward of the front wall from material being discharged from the unloader.

18. A material unloading implement comprising: frame structure including an elongated material container having a pair of oppositely disposed side walls interconnected by a bottom wall; shaft means supported by the structure extending longitudinally of the container between the side walls and above the connecting wall; means on the shaft means including arm elements having shaft-proximate ends and free ends, said arm elements being extensible radially from the shaft means whereby the free ends may move between positions adjacent the shaft means and positions remote the shaft means and being automatically extensible in response to rotation of the shaft means to cause the free ends to engage material next adjacent the shaft and to drive the material upwardly and outwardly from the container; and means rotating the shaft means.

19. A material spreading implement comprising: a main mobile frame movable forwardly over a field; a pair of spaced apart supports on the frame; a fore-and-aft extending rotatable shaft journaled on the supports; a material container longitudinally disposed relative to the shaft and at least partially enclosing the shaft from opposite sides thereof, said container having an inner surface spaced from the shaft; a plurality of axially spaced arm elements mounted on the shaft, each of the arm elements being flexible to bend about the shaft and to extend radially proximate to the inner surface of the container and operative to drive material from the container as the shaft is rotated; and means effecting rotation of the shaft.

20. A material unloading implement comprising: frame structure; an elongated material container supported by the structure having a pair of oppositely disposed side walls interconnected by a bottom wall; shaft means supported by the structure extending longitudinally of the container between the side walls and above the connecting wall; means on the shaft means including arm elements having shaft-proximate ends and free ends, said arm elements being extensible radially whereby the free ends may move between positions adjacent the shaft means and positions remote the shaft means; and means rotating the shaft means.

21. A material unloading implement comprising: frame structure; an elongated material container supported by the structure having a pair of oppositely disposed side walls interconnected by a bottom wall; shaft means supported by the structure extending longitudinally of the container between the side walls and above the connecting wall; means on the shaft means including radial arm elements, said arm elements being extensible radially relative to the shaft means; and means rotating the shaft means.

References Cited in the file of this patent

UNITED STATES PATENTS

| | | |
|---|---|---|
| 402,183 | Oviatt | Apr. 30, 1889 |
| 565,294 | Muir | Aug. 4, 1896 |
| 822,262 | Engh | June 5, 1906 |
| 1,846,459 | Romera | Feb. 23, 1932 |
| 2,318,881 | Mundy | May 11, 1943 |
| 2,525,023 | Ensminger | Oct. 10, 1950 |
| 2,531,732 | Hoffman | Nov. 28, 1950 |
| 2,597,485 | Hillyer | May 20, 1952 |
| 2,699,948 | Neighbour | Jan. 18, 1955 |

FOREIGN PATENTS

| | | |
|---|---|---|
| 299,827 | Germany | Aug. 11, 1917 |

UNITED STATES PATENT OFFICE

CERTIFICATE OF CORRECTION

Patent No. 2,886,332　　　　　　　　　　　　　　　　　　　May 12, 1959

Keith D. Elwick

It is hereby certified that error appears in the printed specification of the above numbered patent requiring correction and that the said Letters Patent should read as corrected below.

Column 6, line 42, strike out "inner"; column 7, line 8, for "arm elements" read -- arm element --.

Signed and sealed this 1st day of September 1959.

(SEAL)

Attest:

KARL H. AXLINE
Attesting Officer

ROBERT C. WATSON
Commissioner of Patents